Patented July 21, 1936

2,048,545

UNITED STATES PATENT OFFICE 2,048,545

ADRENAL HORMONES AND METHOD OF OBTAINING THE SAME

Max A. Goldzieher, Brooklyn, N. Y.

No Drawing. Application May 23, 1928, Serial No. 280,120

3 Claims. (Cl. 167—77)

The present invention relates to adrenal hormones and the method of obtaining the same, and, more particularly to the active principle or hormone, substantially free from protein or other impurities, obtained and isolated from adrenal glands, including thereby any and all parts thereof which contain the active principle or hormone, and whether of the suprarenal, or the interrenal glands, or equivalent organ, in mammalia, as well as in the lower animals, and which isolated principle is useful in treating adrenal insufficiency and ailments resulting from disturbances of lipoid metabolism, and by hyperactivity of the sympathetic nervous system.

A systematic investigation, which I have carried on for quite a number of years, revealed the fact that mammalian adrenals, particularly the cortices of the adrenals, and the interrenal glands of lower animals contain an internal secretion or hormone useful for the treatment of diseases which affect or impair the function of the adrenal cortex. Impairment of the adrenal cortex occurs frequently in the new born, due to hemorrhage. It is a very common feature in the course of infectious diseases, particularly pneumonia. The adrenal cortex is also affected or destroyed by chronic inflammatory conditions, particularly by tuberculosis and occasionally by tertiary syphilitic processes. If the destruction is rapid, as in acute infections or hemorrhage, the syndrome of acute insufficiency develops, its outstanding symptoms being high temperature and rapid, shallow respiration. If the destruction is slow, the well known picture of Addison's disease develops. In a number of diseases which are commonly attributed to functional disturbances of other endocrine glands, the proper function of the adrenal cortex is also interfered with.

The substance prepared in accordance with the present invention is useful in the treatment of the diseases and symptoms above recited, and is obtained as follows: The internal secretion or hormone is extracted from mammalian adrenals or the interrenal glands of lower animals with a solvent capable of preserving the activity of the internal secretion or hormone, and then separating it practically free from injurious substances, including proteins.

The following steps are employed in several methods for obtaining a practically pure extract from the fresh adrenals of mammalia or the interrenal glands of lower animals:

(1) Separation of the internal secretion or hormone from the fresh mammalian adrenals or the interrenal glands of lower animals by extraction with solvents, such as weak acids or 70% alcohol, which is, preferably, acidified. As an efficient acid 0.2 normal hydrochloric acid may be mentioned.

(2) Precipitation of the internal secretion or hormone with adherent substances, such as various proteins, from the weak acid by a suitable salt, such as, for instance, sodium chloride or ammonium sulphate, and collection of the precipitate on a filter. The salt is added, preferably, to complete saturation. If an alcohol solvent is used, the salting is omitted and the precipitate is obtained immediately by amyl alcohol.

(3) Removal of the impurities, such as various proteins, by dissolving the precipitate in 70% alcohol; filtering the solution so obtained and adding five volumes of amyl alcohol, whereby a precipitate is obtained. The last-mentioned precipitate is collected on a filter and dissolved in 80% alcohol. Thereafter the precipitate is filtered and the filtrate inspissated in vacuo, or evaporated in a dry air current. The dry substance is thereafter repeatedly dissolved in 80% alcohol, filtered and dried.

Instead of using a salt for separating the substance, with the adherent impurities, from the weak acid solvent, isolectric precipitation methods may be used. In such case sodium hydroxide is added cautiously until a precipitate is obtained. The latter is then collected on a filter, dissolved in 70% alcohol, and purified in the manner above described.

The two methods above-mentioned may also be combined, that is to say the precipitate may be obtained by means of a salt and dissolved in hydrochloric acid, and the latter solution precipitated by adding sodium hydroxide.

The purified substance is an amorphous yellowish-white powder, unsoluble in cold distilled water and slightly soluble in warm distilled water. It dissolves quickly in weak acids, and in alcohols up to concentration of 90%. The substance does not well dissolve in absolute alcohol and precipitates from alcoholic solutions at ice-box temperature. It is not soluble in weak alkalis, ether, chloroform, benzene and xylene. It is subject to dialysis, although not quickly. It has been found that the substance is not very stable. If it is kept at room temperature in contact with air, its color changes to yellowish brown, losing its biological effects. By heating it to 100° C., it can be made inactive.

Any one of the well known reactions for protein indicate that the substance is protein free.

It contains the following elements: Carbon, nitrogen, oxygen, hydrogen and sulphur. Quantity determination of these constituents shows substantially the following percentages:

Carbon 43%; nitrogen 13.3%; oxygen 37.3%; hydrogen 5.1%; and sulphur 1.3%.

In order to determine the biological activities of the substance, experiments were conducted on animals. In the course of these experiments intravenous injections were used, and the standard dose given was approximately the amount of substance obtained from one-quarter of a bovine adrenal per one kilogram body weight of the experimental subject; the same being a rabbit. The amount mentioned does not ordinarily affect the rabbit. Sometimes the animal, to which an injection had been administered, died within a few minutes after the injection from respiratory failure. If larger doses were administered, more animals succumbed, but some of the rabbits stood as much as ten times the dose which is fatal to others.

Chemical examination of the blood after intravenous injection of the substance shows that there is an almost immediate drop of the blood lipoids, which reaches its lower limit from within one-half of an hour to one hour after injection. The original level is regained within the next two or three hours, and there is occasionally a rise above the original level after four hours. Both the cholesterol and phosphor containing lipoids participate in this reaction. Investigations show that the lipoids which disappear from the blood under the effect of the substance are fixed in the tissues, particularly of the liver and spleen, as revealed by histological examination. It has also been found that the blood sugar is apparently not directly affected by the injection of the substance.

In order to demonstrate the efficacy of the substance, in the beginning animals were used from which the adrenal glands had been removed. The experimental subjects were rats. A vast majority of these animals died from within forty-eight hours to one week, and only a few survived while developing the symptoms of chronic adrenal insufficiency. It is, however, possible to maintain life and apparent good health in a large number of adrenal-ectomized rats by injecting them daily with the substance.

In a new-born child which developed a hemorrhage of the adrenal gland with the clinical symptoms of adrenal insufficiency, the substance was injected intravenously. After each injection there was immediate improvement of the most conspicuous symptoms, such as rapid superficial breathing and high temperature. The effects of a single injection lasted for a few hours but subsided within six hours. The treatment was continued for over two weeks, during which period the child recuperated to such an extent that the injections could be discontinued. The child was discharged as cured, is alive and in apparent good health.

The extract obtained by each of the abovementioned methods from the adrenal glands of mammalia or equivalent organs of lower animals as I have hereinabove generically defined the same, is suitable for administration to human patients and has a distinct value in the treatment of diseases which impair the function of the adrenal cortex, alleviating or curing the symptoms of these diseases alone or together with other therapeutics.

What I claim is:—

1. The process which consists in extracting fresh adrenal glands with a weak acid water solution, saturating the filtrate with a salt to produce a precipitate, collecting the precipitate, dissolving the precipitate in alcohol, producing a precipitate by adding amyl alcohol to the solution, collecting the precipitate and drying it.

2. The process which consists in extracting fresh adrenal glands with a weak hydrochloric acid solution, saturating the filtrate with sodium chloride to produce a precipitate, dissolving the precipitate in 70% alcohol, adding amyl alcohol to the solution to produce a precipitate, dissolving this precipitate in alcohol and driving off the alcohol to produce a dried extract.

3. The process which consists in extracting fresh adrenal glands with a weak hydrochloric acid solution, saturating the filtrate with sodium chloride to produce a precipitate, dissolving the precipitate in 70% alcohol, adding amyl alcohol to the solution to produce a precipitate, dissolving this precipitate in alcohol, driving off the alcohol to produce a dried extract, and repeatedly dissolving the precipitate in alcohol, filtering and drying it to purify it.

MAX A. GOLDZIEHER.